United States Patent [19]
Jeffryes

[11] Patent Number: 6,023,658
[45] Date of Patent: Feb. 8, 2000

[54] NOISE DETECTION AND SUPPRESSION SYSTEM AND METHOD FOR WELLBORE TELEMETRY

[75] Inventor: Benjamin P. Jeffryes, Histon, United Kingdom

[73] Assignee: Schlumberger Technology Corporation, Sugar Land, Tex.

[21] Appl. No.: 08/831,548

[22] Filed: Apr. 9, 1997

[51] Int. Cl.[7] .................................................. G01V 1/00
[52] U.S. Cl. ............................................................ 702/16
[58] Field of Search .................................. 367/81, 82, 83; 191/12; 702/16, 6, 10

[56] References Cited

U.S. PATENT DOCUMENTS

| | | |
|---|---|---|
| 3,789,355 | 1/1974 | Patton . |
| 3,790,930 | 2/1974 | Lamel et al. . |
| 3,820,063 | 6/1974 | Sexton et al. . |
| 3,904,840 | 9/1975 | Kostelnieck ............................. 191/12 |
| 4,562,559 | 12/1985 | Sharp et al. . |
| 4,739,325 | 4/1988 | MacLeod . |
| 4,785,300 | 11/1988 | Chin et al. . |
| 4,825,421 | 4/1989 | Jeter . |
| 4,839,870 | 6/1989 | Scherbatskoy . |
| 4,847,815 | 7/1989 | Malone . |
| 4,878,206 | 10/1989 | Grosso et al. ............................ 367/83 |
| 4,932,005 | 6/1990 | Birdwell . |
| 4,954,998 | 9/1990 | Rector ...................................... 367/82 |
| 5,055,837 | 10/1991 | Abdallah et al. . |
| 5,073,877 | 12/1991 | Jeter . |
| 5,128,901 | 7/1992 | Drumheller . |
| 5,222,049 | 6/1993 | Drumheller . |
| 5,289,354 | 2/1994 | Clayer et al. ............................ 367/82 |
| 5,381,092 | 1/1995 | Freedman . |
| 5,592,438 | 1/1997 | Rorden et al. . |

FOREIGN PATENT DOCUMENTS

| | | | |
|---|---|---|---|
| 2201541 | 4/1997 | Canada ..................................... 367/81 |
| 2201552 | 4/1997 | Canada ..................................... 367/81 |
| 2140599 | 2/1987 | United Kingdom . |
| WO 95/14845 | 6/1995 | WIPO . |

OTHER PUBLICATIONS

"Adaptive Signal Processing", Prentice–Hall, Inc., Engelwood Cliffs, N.J., pp. 99–225, 1985.
S. P. Monroe, "Applying Digital Data–Encoding Techniques to Mud Pulse Telemetry", SPE Conference Paper 20326, Denver, Colorado, Jun. 25–28, 1990.
John R. Evans, "Running Median Filters and General Depiker", Bulletin of the Seimological Society of America, vol. 72, No. 1, pp. 331–338, Feb., 1982.

*Primary Examiner*—Christine K. Oda
*Assistant Examiner*—Victor J. Taylor
*Attorney, Agent, or Firm*—William L. Wang; Peter Y. Lee; Brigitte L. Jeffery

[57] ABSTRACT

Methods and apparatus are described for identifying and removing noise from borehole telemetry signals. A spectrum of the signal and of an approximated noise-free spectrum of the signals are generated and compared so as to identify frequencies at which noise occurs. The approximated spectrum is preferably generated by an averaging or integrating process which essentially results in a smoothened variant of the signal spectrum. The comparison includes dividing the signal spectrum by the approximated spectrum, and setting a threshold in the resulting dimensionless peak spectrum. The remaining parts of the peak spectrum are identified as noise. The dimensionless spectrum is found to have major advantages when having to identify noise frequencies.

22 Claims, 6 Drawing Sheets

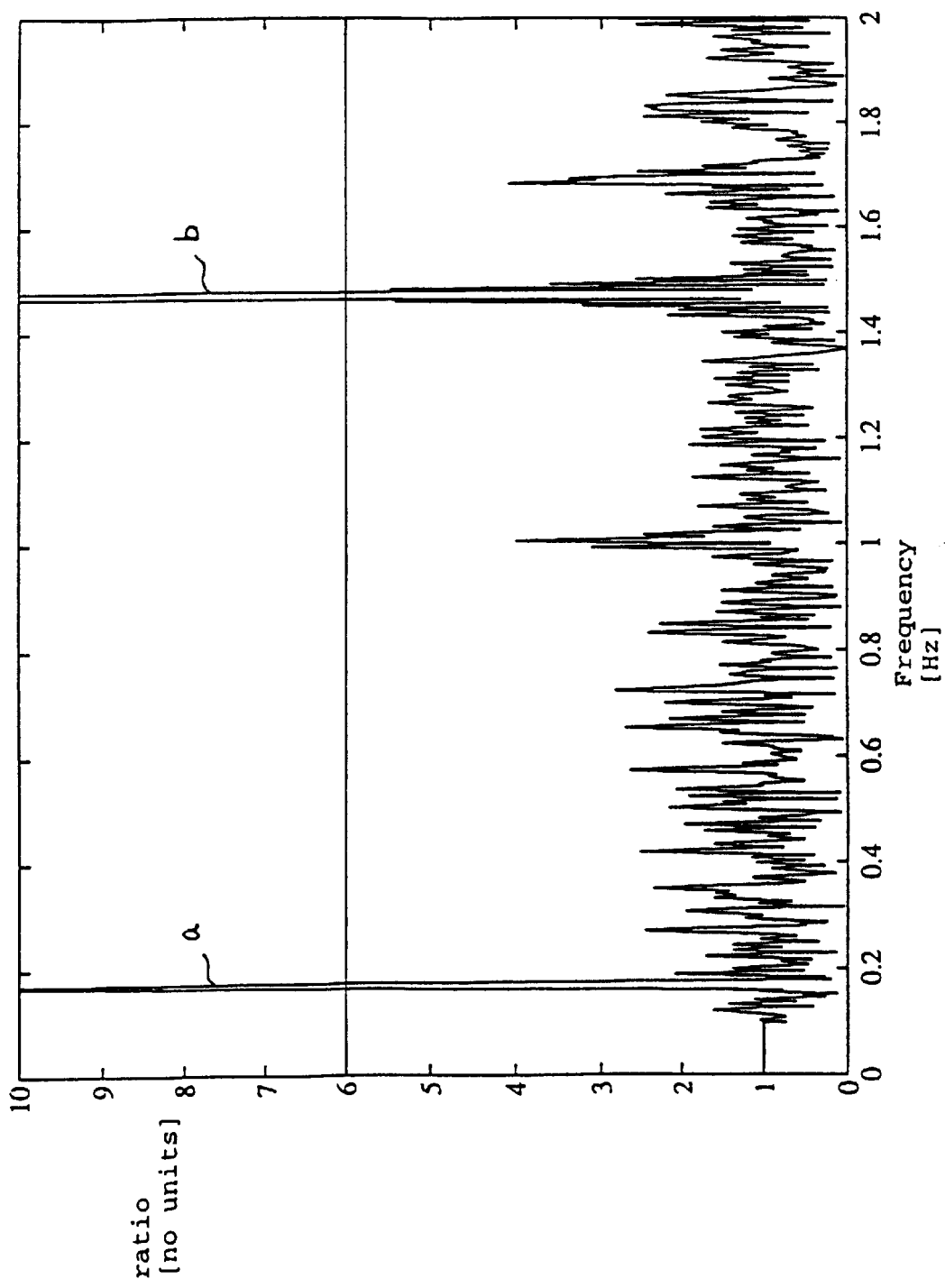

NOISE DETECTION AND SUPPRESSION SYSTEM AND METHOD FOR WELLBORE TELEMETRY

BACKGROUND OF THE INVENTION

1. Field of the Invention

The present invention relates to telemetric systems communicating data through noisy transmission channels. The present invention particularly relates to telemetric systems in formation evaluation or borehole telemetry. More specifically it relates to the identification and suppression of noise in such channels.

2. Description of the Related Art

In the development, completion, and operation of natural hydrocarbon reservoirs, various telemetric systems and techniques are known and employed to achieve what is known in the art as measurement while drilling (MWD).

For the purpose of this application, MWD includes any type of data transmission from sensor units in the drill bit, bottom hole assembly, or any other part of the sub-surface drill string. Another acronym often encountered in the art besides MWD is LWD (Logging While Drilling). MWD includes in particular low data bit rate transmission systems, as operating below 10 kHz, preferably below 1 kHz, such as acoustic telemetry through the drill string itself, or mud pulse telemetry.

In the latter, currently prevailing technique data are transmitted by means of a mud pressure pulse generator located inside the drill string. The system generates pressure pulses in the drilling fluid or mud, typically by way of a valve or siren type of device. The pulses are detected at the surface by suitable means, e.g., pressure sensors, strain gages, accelerometers, and the like, which means are in general directly attached to the drill string.

Borehole or wellbore telemetry is a well established technology. Improvements to this technology as have been made over the past decades are published for example in a large number of patents, including U.S. Pat. Nos. 3,790,930; 3,820,063; 4,739,325; and 4,932,005.

Of particular interest for the scope of the present invention are the numerous attempts being made to improve the data detection of the transmitted data at the surface. It should be noted that the drilling process presents an exceedingly noisy environment for telemetry owing to the mechanical generation of broadband noise and to the drilling fluid circulation system.

To improve the signal-to-noise ratio, the data as gathered by the sensor units can be encoded such that the distortion by noise has less impact on the data recovery. Usually employed encoding schemes include Frequency Shift Keying (FSK), Phase Shift Keying (PSK) or m-ary pulse coding. Alternatively a binary non return to zero coding may be used. Different encoding methods are described for example in U.S. Pat. Nos. 3,789,355 or 4,562,559.

In U.S. Pat. No. 5,381,092 the signals from those sensors which evaluate the earth formation are subdivided prior to transmission into a plurality of groups, each group represented by one value.

In U.S. Pat. 5,055,837 an attempt is described to improve the quality of the transmission by determining a transfer function which characterizes the transmission properties of the drilling fluid column in the drill pipe.

In an acoustic telemetry system, as described in U.S. Pat. No. 5,128,901, the data signals are (pre-)conditioned to counteract distortions caused by the drill string.

A filtering technique to cancel or minimize noise in the transmitted data signals is disclosed in U.S. Pat. No. 4,878,206. This known approach uses independent measurements of the vibrations of the drill string at the surface to remove pressure disturbance caused by these vibrations and affecting the mud column pressure. A similar technique is known from U.S. Pat. No. 5,289,354.

Probably the closest prior art is an undocumented, "manual" approach to noise filtering, wherein an experienced operator searches the frequency spectrum of the transmitted signal for obvious peaks, marks those frequencies at which the peaks occurs and selects appropriate filters to remove them from the signal. This procedure depends on the quality of the operator. It can not be used to provide a deterministic, reliable, and real-time operation service.

A straightforward automation of the above process faces difficulties arising from the nature of wellbore telemetry signals. Those signals are characterized by a low S/N ratio, large fluctuations in the absolute value of the signal and drifts or baseline shifts.

In view of the above cited prior art it is an object of the invention to provide an automated telemetry system with improved noise reduction and cancellation. The system should be compatible with or independent from the various transmission media and encoding methods. It is a particular object of the invention to provide such a system for downhole telemetry in the low frequency domain, in particular for mud pulse telemetry.

SUMMARY OF THE INVENTION

The above-mentioned objects of the invention are achieved by apparatus and methods as set forth in the appended claims.

It is seen as a first important feature of the invention that noise frequencies are identified from a dimensionless spectrum, which is in a preferred embodiment of the invention generated by dividing the signal spectrum and another spectrum representing an approximation of the noise-free signal.

The spectrum of the gathered telemetry signal and an approximation of a noise-free spectrum of the gathered signal is generated, preferably using a Fourier-type transformation. The approximated spectrum is preferably generated by averaging or integrating the signal spectrum. This process is based on the observation that noise in downhole telemetry often has a narrow bandwidth.

Dimensionless is defined for the scope of the present invention as having the nature of a pure number, with a value independent from the choice of units. The property of being dimensionless should not be confused with the numbers having arbitrary units such as often encountered in cases where the absolute value in SI or other internationally standardized units is of no importance for the result displayed.

From the dimensionless peak spectrum noise frequencies can be determined by, for example, setting a threshold above which every part of the peak spectrum is regarded as noise. In this process, it is an important advantage for borehole telemetry to be independent of absolute values, as the telemetry signals in this technical field are prone to various drifts and sudden changes caused by external sources.

To facilitate computation, the signal is prior processing subdivided into adjoining time intervals.

Obviously the invention is not restricted to the transmission of signals to the surface, but could also be employed in downhole receivers which are responsive to control commands sent from the surface.

These and other features of the invention, preferred embodiments and variants thereof, and advantages will become appreciated and understood be those skilled in the art from the detailed description and drawings following hereinbelow.

BRIEF DESCRIPTION OF THE DRAWINGS

FIGS. 4A–4C show spectra illustrating major aspects of an example in accordance with the invention.

DESCRIPTION OF THE PREFERRED EMBODIMENT

Figure 1:
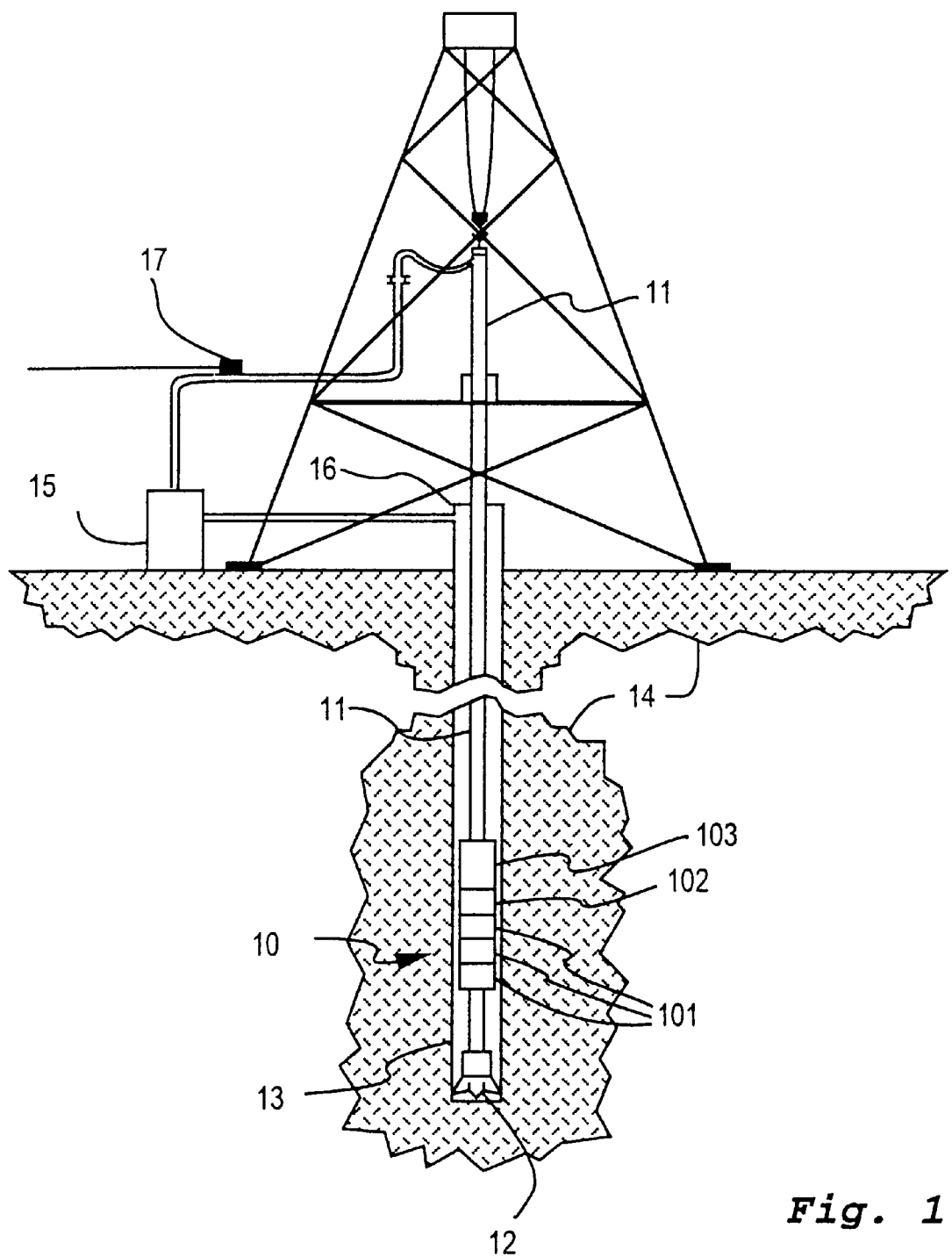
FIG. 1 shows a schematic view of a mud pressure pulse generator and drill string as providing the background for an example of the present invention.

Referring now to the drawings, there is shown in FIG. 1 a tubular MWD tool 10 connected in a tubular drill string 11 having a rotary drill bit 12 coupled to the end thereof and arranged for drilling a borehole 13 through earth formations 14.

As the drill string 11 is rotated by the drilling rig, substantial volumes of drilling fluid ("drilling mud") are continuously pumped by mud pumps 15 down through the drill string 11 and discharged from the bit 14 to cool and lubricate the bit and carry away cuttings removed by the bit. The mud is returned to the surface along the annular space 16 existing between the walls of the borehole 13 and the exterior of the drill string 11. This circulating stream of mud can be used for the transmission of pressure pulse signal from the MWD tool 10 to the surface.

The MWD tool 10 of this example is an integral part of the drill-string bottom hole assembly. It comprises measuring devices 101 for environmental and drilling parameters and appropriate encoders 102 to reduce and refine electrical signals representative of the measured parameters for transmission via mud pulse telemetry signals to the surface. In this example the WD tool measures direction and inclination of the hole, gamma radiation, temperature, and weight and torque on bit. Sensors and tools for other parameters such as downhole pressure, downhole resistivity or conductivity of the drilling mud or formation, neutron spectroscopy etc. might be added. It should however be radiation, temperature, and weight and torque on bit. Sensors and tools for other parameters such as downhole pressure, downhole resistivity or conductivity of the drilling mud or formation, neutron spectroscopy etc. might be added. It should however be obvious that the present invention is not concerned with any specific kind of parameter or measuring device as used in the wellbore.

Electrical power for the operation of the tool is provided by battery producing electrical energy. The tool 10 also includes a modulator, or mud siren, 103 which selectively interrupts or obstructs the flow of the drilling mud through the drill string in order to produce pressure pulses in the mud. Suitable generators are for example described in U.S. Pat. No. 4,785,300; 4,847,815; 4,825,421; 4,839,870 and 5,073,877.

The modulator 103 is controlled such that the pressure pulses are produced in the form of encoded acoustic data signals which correspond to the encoded signals from the measuring devices 101. These signals, typically in the form of binary coded sequences, are transmitted to the surface by way of the mud flowing in the drill string.

In the present example NRZ (Non-Return-to-Zero) telemetry is used to communicate information to the surface. In NRZ modulation the symbols are binary ones and zeros. The system states are the modulator closed (corresponding to a one) and the modulator open (corresponding to a zero). Thus, if two succeeding bits are the same the modulator does not move. If a one follows a zero the modulator closes, if a zero follows a one the modulator opens.

Other signal modulation techniques are usable, and selection of the specific encoding and modulation schemes to be employed in connection with the operation of the modulator are matters of choice. A number of possible modulation schemes for acoustic borehole telemetry are described by S. P. Monroe, "Applying digital data-encoding techniques to mud pulse telemetry", Proceedings of the 5th SPE Petroleum Computer Conference, Denver, Jun. 25–28, 1990, SPE 20236, pp. 7–16.

When these signals reach the surface, they are detected, decoded and converted into meaningful data by a suitable signal detector 36, which in the present example includes a electro-mechanical transducer which is generally known in the art as SPT (Stand-pipe Pressure transducer) 17. Transducers suitable for a acoustic signal/pressure conversion into electrical signals are also found in the published UK Patent GE-A-2 140 599, in U.S. Pat. No. 5,222,049, and in the published International Patent Application WO-A-95/14 845.

The analog signal of the SPT is sampled at an appropriate frequency to derive a digitally coded representation of the analog signal, which then can be further processed as described in the following.

Figure 2:
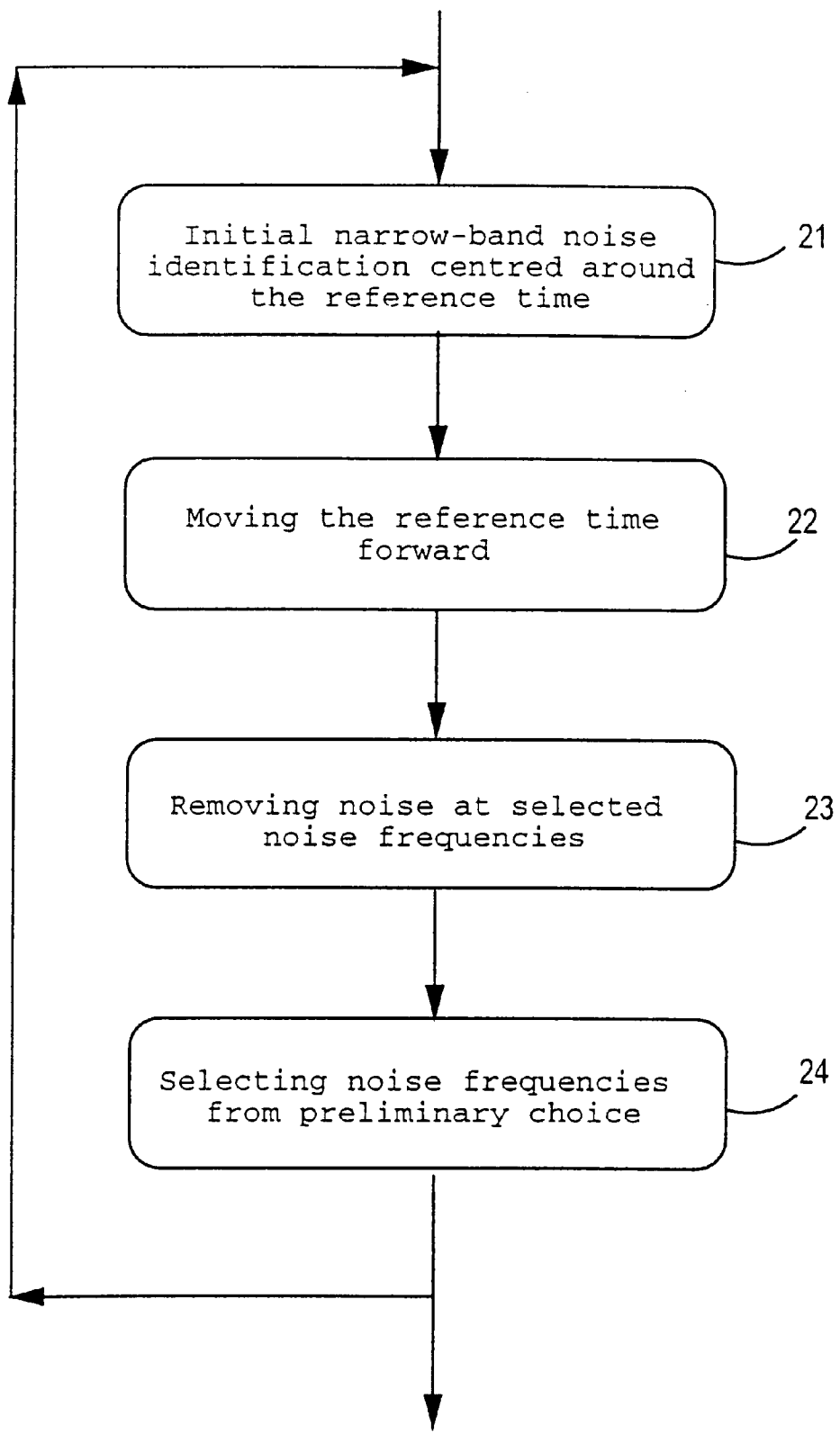
FIG. 2 shows a flow diagram illustrating major functions of a noise identification and removing system in accordance with an example of the present invention.

Referring now to FIG. 2, the major steps for removing the noise from transmitted and received signals are described.

The first step 21 comprises the identification of noise by determining its frequency spectrum or at least its major frequency component or components in a time interval, hereinafter also referred to as the data vector, which taken from the received signal.

In a second 22 and third step 23 noise frequencies are selected and removed from the signal.

After noise removal, an adjacent time interval, i.e., the subsequent data vector of the received signal is selected (step 24). And the procedure is reiterated until the complete signal is processed.

It should be noted that the above-described sequence of steps not necessarily reflects a fixed temporal order. It is for example feasible to process several intervals of the signals in parallel and thus accelerating the noise identification.

Figure 3:
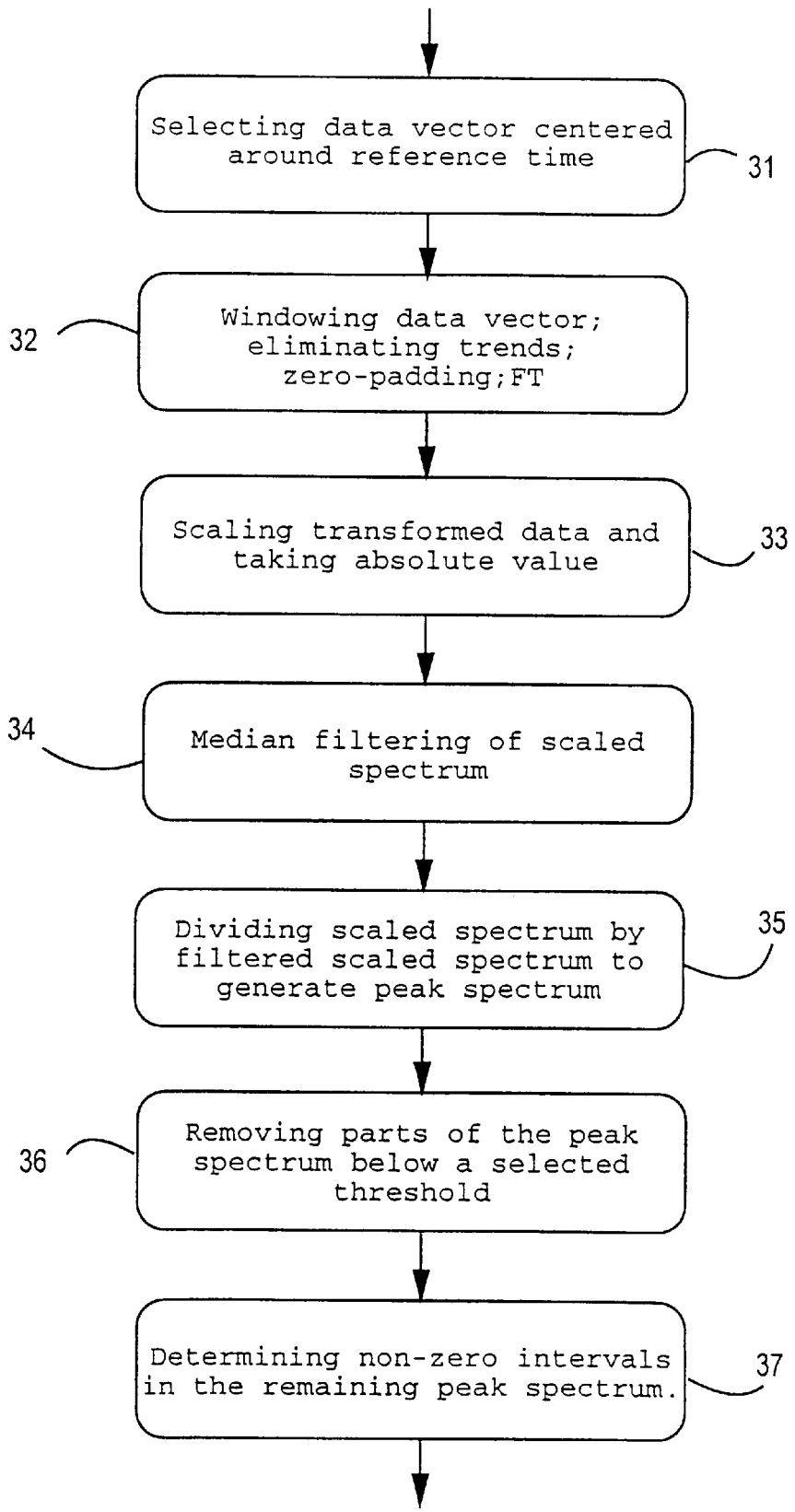
FIG. 3 shows a flow diagram illustrating major functions of a noise identification step within the system of FIG. 2.

The noise identification is regarded as one of the key steps of the present invention; it is described in greater detail making reference to FIG. 3.

The noise identification includes the step 31 of selecting a data vector. In the current example the data vector spread over or drifts, methods and means for removing these trends are employed. Preferable this step is performed before any transformation into the frequency domain. Normally the best-fit line using least-square based is sufficient to remove a trend from the data. Other means and methods are readily available to a person skilled in the art. The parameters for the line fit are retained for a reconstruction of the data after the noise removal.

The data vector is then transformed by a Fourier transformation into the frequency domain. In a particularly preferred variant of the present example the chosen data vector is multiplied by a suitable windowing function (such as a flat window with cosine end-tapers), and padded with zeros—lengthening the data four or eight fold, thereby enhancing the resolution of the spectrum.

Zero padding introduces side-bands next to the noise peaks, but these are removed in later step 36 as is described below. The Fourier transform itself can be performed for example by a accordingly programmed multi-purpose microprocessor, a digital signal processor (DSP), or an application specific integrated circuit (ASIC).

After the spectrum of the data vector is determined in absolute values, in one variant of the invention, the spectrum is scaled such that if only signal were present the spectrum would be approximately flat. For the NRZ telemetry of this example the spectrum is roughly proportional to the inverse of the frequency, so the spectrum is multiplied by the frequency to flatten it. This step 33 is not essential, but can improve results.

In a further step 34, a running median filtering process is applied to the spectrum. The filter has a window length of 0.2 Hz. Essentially this step results in a smoothened version of the original spectrum, in which all peaks are largely reduced in height. Though this method generally gives the best results, other methods, which can be summarized as a weighted median or mean value based, could be applied to generates a smoothened version of the spectrum of the signal. Other integrating methods are feasible.

In another example the (non-windowed) median of the complete spectrum is used as an approximation of the noise-free spectrum.

In yet a further example, a windowed or shifting mean of the spectrum is used as an approximation of the noise-free spectrum.

From these different variants, the windowed median filtered spectrum provides the best results under usual circumstances.

Returning now to FIG. 3, in the next steps 35 and 36 the smoothened spectrum is used to identify the peaks in the original spectrum. This is done by dividing both spectrums and using a threshold to suppress all amplitude below a threshold, which is 5 in the present example. The advantage of using a division rather than the difference spectrum lies in that the resulting spectrum is independent from absolute values or units.

To eliminate those side bands which are introduced by the zero-padding in step 32, from the resulting peak spectrum, any non-zero intervals in the peak spectrum that are close to, but have a maximum value smaller than, another non-zero interval are discarded in step 37. Now the frequencies within each interval at which the peak spectrum attains a maximum are found. If the maximum is above a second threshold value (usually chosen to be greater than 6), then this frequency is identified as being narrow-band noise frequency. If the maximum is between the two thresholds then the frequency is only identified as a noise frequency if it is the same as or very close to a frequency that has previously been identified as a noise frequency. This is to allow for frequency drift, and for noise sources whose amplitude goes up and down.

Figure 4A:
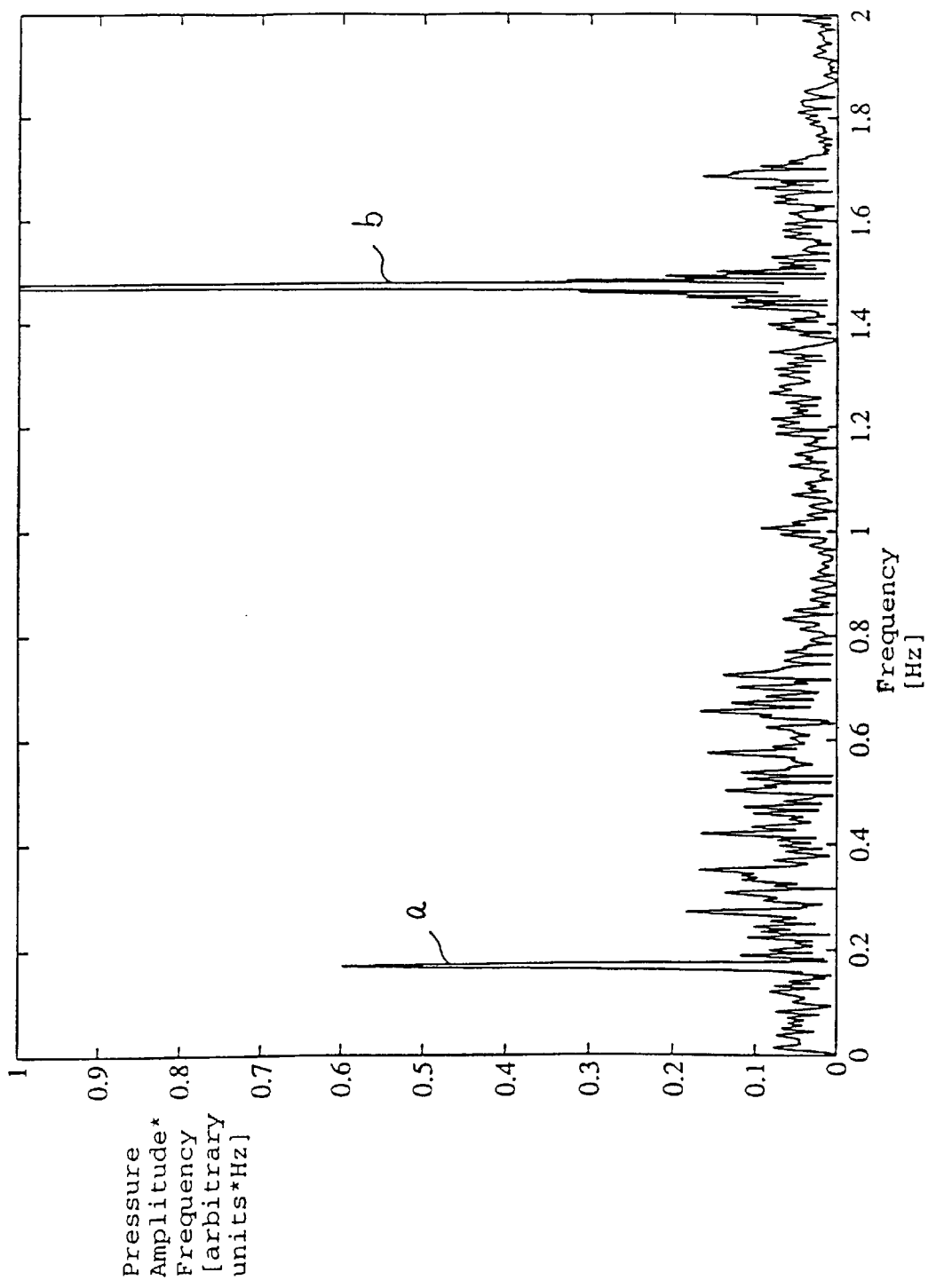
Figure 4B:
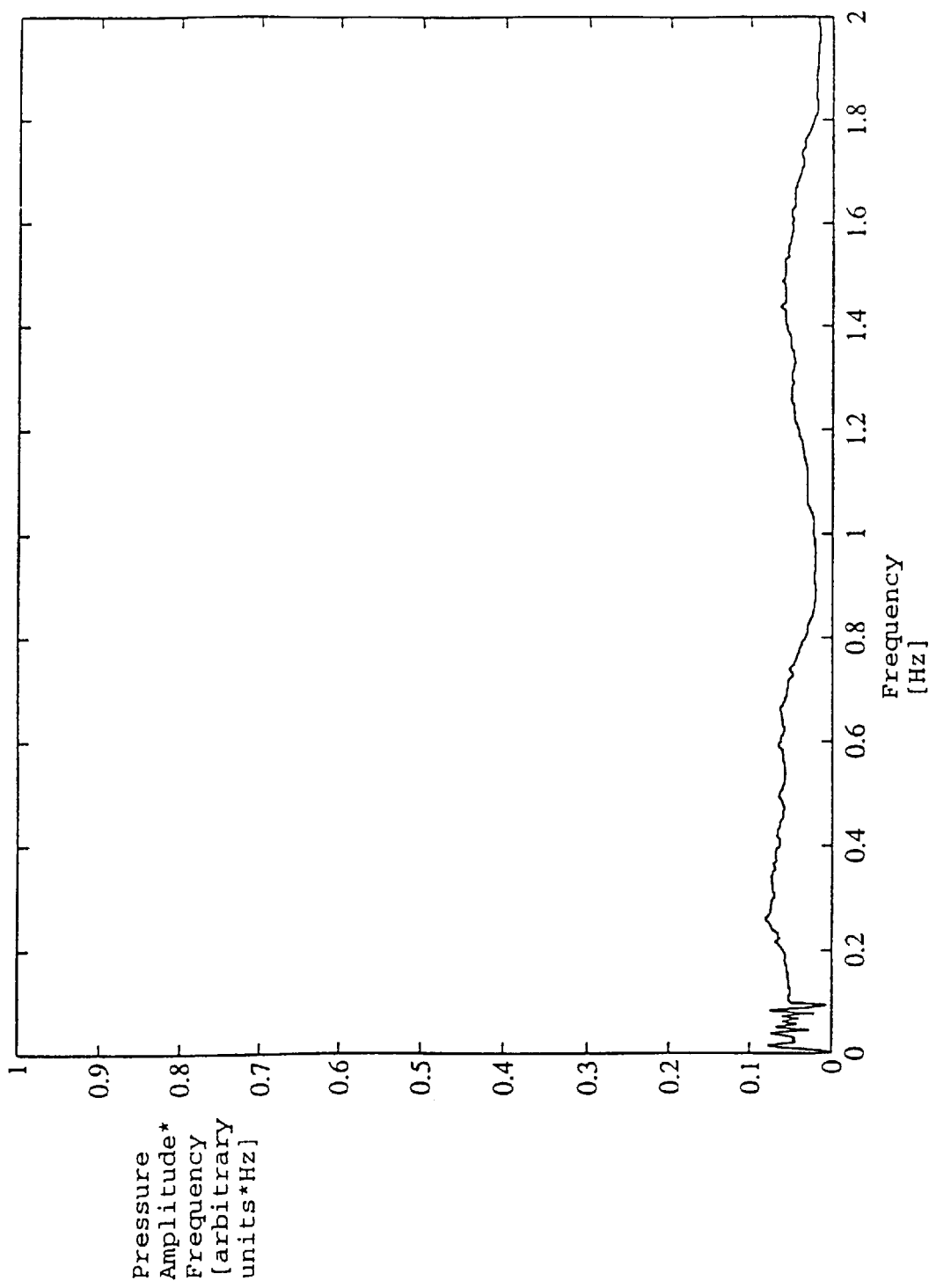

The results of the above described operations are displayed in FIG. 4. The frequency scaled spectrum with the prominent noise frequencies (a,b) is shown in FIG. 4A. A smoothened version of this spectrum is produced by windowed median filtering (FIG. 4B).

In FIG. 4C the result of a division of the original spectrum (FIG. 4A) and its median filtered version (FIG. 4B) is shown. The resulting "peak spectrum" is dimensionless. The threshold separates the (assumed) noise (a,b) from the signal.

The result of the process is a (possibly empty) list of frequencies at which there is narrow-band noise.

The noise removal process make use of the frequency identified through the previous steps as contaminated with noise. With these information a variety of different filtering techniques can be applied to the original data to reduce or cancel the noise in the signal.

One possibility is to employ notch filters with notches at the noise frequencies, or adaptive Least-Mean-Square (LMS) methods described as such by B. Widrow and S. D. Stearns in: "Adaptive Signal Processing", Prentice Hall, 1985, on pp. 212–224 and pp. 99–116, respectively.

The method used for removing the noise frequencies from the telemetry signal in the present example includes the step of generating, for each of the identified noise frequencies, two noise vectors of mono-chromatic noise at that frequency with a 90 degree phase difference between them, e.g., if the noise frequency is F then the two noise vectors could be $$N_1=\sin(2\pi Ft)\ N_2=\cos(2\pi Ft), \quad (1)$$

with t from a time interval which is much shorter than the original interval, in this example 12 seconds as compared to the 60 to 120 seconds length of the noise identification vector.

Synthesizing noise for all the noise frequencies produces a noise matrix N. Assuming that the data D is corrupted by an additive noise component according to $$D=A\ N+S, \quad (2)$$

where D is the vector of data, S is the underlying signal, N is the matrix of noise synthesized at the narrow-band noise frequencies, and A is the vector of (unknown) noise amplitudes.

The vector A is found by minimized the residual E, given by $$E=\Sigma|D-A\ N|^2. \quad (3)$$

The solution to eq. [3] is given by $$A=(D\ N^T)(N\ N^T)^{-1} \quad (4)$$

where T denotes the transposed matrix, and the signal is given by reordering equation [2]:

$$S=D-A\ N. \quad (5)$$

This process may also be carried out over a slightly longer noise removal vector, multiplied by a windowing function that is one over the original range of the removal vector, as defined above, and beyond goes smoothly to zero, in which case the noise vectors are multiplied by the same windowing function.

The signal has its trend reinstated, adding back the linear function removed during noise identification, and a data jump is avoided by adding a constant to the data such that the last point of the previously-processed data and the first point of the current data are the same.

The reference time is then moved forward by the length of the noise-removal vector, and the process is repeated.

An improvement can be made to the method described above when the signal is also subject to time-domain spike noise, and the data has a wider bandwidth than the signal alone. Spike noise causes problems with Fourier techniques, since when a large spike is within the noise-identification vector, the frequency transform is dominated by the spike. Spike removal may be achieved by using a running-median filter on the data, and comparing the original data with the median filtered version. An example of this method is described as such in "Running median filters and a general despikker", in: Bull. Seism. Soc. Am. 72 (1982), pp. 331–338, by J. R. Evans. If the difference is greater than a threshold, the original data is replaced by the median filtered version—if not then it is unaltered. To this end, the data is low-pass filtered with a bandwidth that exceeds the signal bandwidth, preferably by a factor of two. The median filter length is then chosen so that the spikes, after low-pass filtering will be contained within the filter length. A suitable length L is given by $$L = 3 + 2 * \frac{F_N}{F_L} \qquad [6]$$

where $F_N$ is the Nyquist frequency and $F_L$ is the frequency at which the data has been low-pass filtered.

The process is performed on a general purpose computing machine which receives the signal from the SPT and on which a suitable program, e.g. "MATLAB" is installed. Other possibilities for implementing the method include the use of a dedicated microprocessor, known as such as DSPs or ASICs.

I claim:

1. A noise filtering apparatus for wellbore telemetry data signals, comprising:

a receiver located on the surface and adapted to receive a wellbore telemetry data signal, said telemetry data signal including data which represents one or more downhole measurements conducted downhole during a drilling operation, the data being unknown to the receiver prior to reception;

a transformer in communication with said receiver and adapted to transform at least part of the telemetry data signal to generate therefrom a spectrum of at least part of the telemetry data signal;

an approximator in communication with said transformer adapted to generate an approximation of a noise-free spectrum of the at least part of the telemetry data signal;

a ratio calculator in communication with said approximator adapted to generate a dimensionless spectrum by calculating the ratio of the spectrum of at least part of the telemetry data signal and the approximation of a noise-free spectrum; and an identifier in communication with said ratio calculator adapted to analyze the dimensionless spectrum and select frequencies from said dimensionless spectrum that are characterized by a substantial level of noise.

2. The apparatus in accordance with claim 1, wherein the approximator comprises a weighted means based filter, and the weighted means based filter is applied to the spectrum of at least part of the telemetry data signal to produce therefrom the approximation of a noise-free spectrum of the at least part of the telemetry data signal.

3. The apparatus in accordance with claim 1, wherein the approximator comprises a median filter, and the median filter is applied to the spectrum of at least part of the telemetry data signal to produce therefrom the approximation of a noise-free spectrum of the at least part of the telemetry data signal.

4. The apparatus in accordance with claim 1, further comprising means for filtering the selected frequencies from the telemetry data signal.

5. The apparatus in accordance with claim 1, further comprising means for removing spike-type noise from the telemetry data signal prior to the generation of the dimensionless spectrum.

6. The apparatus in accordance with claim 1, further comprising means for setting a predetermined threshold in the dimensionless spectrum, and means for discarding all values of the dimensionless spectrum which have a value below the predetermined threshold.

7. A wellbore telemetry apparatus for gathering data related to subsurface conditions and for transmitting said data to the surface, said apparatus comprising:

a first transducer located in a well adapted and configured to convert data gathered in the well into signals to be in operation transmitted to said surface;

a second transducer located on said surface adapted and configured to reconvert said signals into processable data; and a processor in communication with said second transducer adapted and configured to process said processable data, the processor characterized in that said processor comprises a transformer for generating a signal spectrum of at least a part of the processable data, an approximator for generating an approximation of a noise-free spectrum of said at least a part of said processable data, and a ratio generator adapted to compute the ratio of said signal spectrum and said approximation of a noise-free spectrum so as to identify noise frequencies.

8. A method for identifying a frequency or range of frequencies of noise in a wellbore telemetry data signal, comprising the steps of:

receiving a wellbore telemetry data signal using a receiver located on the surface, said telemetry data signal including data which represents one or more downhole measurements gathered downhole during a drilling operation, the data being unknown to the receiver on the surface prior to reception;

transforming at least part of the telemetry data signal to generate therefrom a spectrum of at least part of the telemetry data signal;

generating an approximation of a noise-free spectrum of the at least part of the telemetry data signal;

generating a dimensionless spectrum by calculating a ratio of the spectrum of at least part of the telemetry data signal and the approximation of a noise-free spectrum; and identifying noise frequencies by analyzing the dimensionless spectrum and selecting frequencies from said dimensionless spectrum.

9. The method of claim 8, wherein the step of generating an approximation of a noise-free spectrum comprises applying a weighted means based filter to the spectrum of at least part of the telemetry data signal to produce therefrom the approximation of a noise-free spectrum of the at least part of the telemetry data signal.

10. The method of claim 8, wherein the step of generating an approximation of a noise-free spectrum comprises applying a weighted median based filter to the spectrum of at least part of the telemetry data signal to produce therefrom the approximation of a noise-free spectrum of the at least part of the telemetry data signal.

11. The method of claim 8, wherein the step of identifying the noise frequencies includes the step discarding all values of the dimensionless spectrum which have a value below a predetermined threshold.

12. The method of claim 8, wherein the step of transforming at least part of the telemetry data signal comprises performing a Fourier transformation or a mathematical equivalent thereof.

13. The method of claim 8, wherein prior to the step of transforming at least part of the telemetry data signal, trends in said telemetry data signal are removed.

14. The method of claim 8, wherein prior to the step of transforming at least part of the telemetry data signal, spikes in said telemetry data signal are removed.

15. The method of claim 8, wherein prior to the step of transforming at least part of the telemetry data signal, a zero signal is added to both sides of the at least a part of the telemetry data signal.

16. The method of claim 8, wherein prior to the step of transforming at least part of the telemetry data signal, the at least part of the telemetry data signal is multiplied by a window function with smooth edges.

17. The method of claim 8, further comprising the step of removing at least some noise from the spectrum of at least part of the telemetry data signal by suppressing noise frequencies as identified in the step of identifying noise frequencies.

18. The method of claim 17, wherein the noise frequencies are suppressed by using a noise matrix N derived from two linear independent state vectors for each identified noise frequency, and minimizing the residual between the gathered signal and a noise vector derived from multiplying said noise matrix N with a vector of unknown noise amplitudes.

19. The method of claim 8, including the step of transmitting control signals for a downhole apparatus.

20. The apparatus of claim 1, wherein the transformer, approximator, ratio calculator, and identifier reside in a general purpose computing machine, and communication between the transformer, approximator, ratio calculator, and identifier is carried out in said general purpose computing machine.

21. The apparatus of claim 1, further comprising:

an electromechanical transducer adapted to detect a raw signal and to convert the raw signal into an analogue electrical signal, the raw signal consisting of acoustic energy transmitted through a drilling fluid; and a processor in communication with said electro mechanical transducer and said receiver, said processor adapted and configured to sample and process the analogue signal to produce the telemetry data signal, and to send the telemetry data signal to said receiver.

22. The method of claim 8, further comprising the steps of:

detecting a raw signal using an electro-mechanical transducer, the raw signal consisting of acoustic energy transmitted through a drilling fluid;

converting the raw signal into an analogue electrical signal;

sampling and processing the analogue signal to produce the telemetry data signal; and sending the telemetry data signal to said receiver.

* * * * *